United States Patent [19]

Cognasse et al.

[11] Patent Number: 4,944,017

[45] Date of Patent: Jul. 24, 1990

[54] ELECTROACOUSTIC INSERT WITH ADDED COIL

[75] Inventors: Christian Cognasse; Peter Graham; Bernard Maury; Jean-Claude Walter, all of Bonneville, France

[73] Assignee: Horlogerie Photographique Francaise, Bonneville, France

[21] Appl. No.: 327,736

[22] Filed: Mar. 23, 1989

[30] Foreign Application Priority Data

Apr. 1, 1988 [FR] France ................ 88 04733

[51] Int. Cl.⁵ .............................. H04B 5/00
[52] U.S. Cl. ..................... 381/79; 381/192; 379/443
[58] Field of Search .......... 381/79, 74, 192, 193, 381/194, 68; 379/443

[56] References Cited

FOREIGN PATENT DOCUMENTS 3140746 4/1983 Fed. Rep. of Germany .
8715846 1/1988 Fed. Rep. of Germany .

Primary Examiner—Jin F. Ng
Assistant Examiner—M. N. McGeary, III
Attorney, Agent, or Firm—Ratner & Prestia

[57] ABSTRACT

The present invention provides an insert (1) forming an independent assembly of a coil body (15). The electroacoustic transducer comprises an insert (1) formed of a case with a vibrating membrane (2) and its electric connectors (4, 5) and a coil body (15) distinct and separable from the insert. The coil body can be fitted to the rear face (14) of the insert and comprises axial passages (20, 21) through which the insert connectors (4, 5) pass. Contact pieces (22, 23) provide the electric connection of the coil with the insert connectors.

10 Claims, 4 Drawing Sheets

ELECTROACOUSTIC INSERT WITH ADDED COIL

BACKGROUND OF THE INVENTION

1. Field of the Invention

The present invention relates to telephone receiver inserts, generally comprising a case containing a vibrating element for transforming into sound vibrations the electric signals conveyed to its input terminals by a supply line.

In the transducers used at present for telephony reception, the vibrating element is formed of a membrane held in position by its periphery in an insert case. The case comprises a base body with a central cavity whose periphery forms a bearing surface for the periphery of the vibrating membrane; the case further comprises a cover connected by its periphery to the base body and including an inner recess communicating with the outside through at least one orifice; the periphery of the cover comprises an inner annular relief bearing on the periphery of the membrane for holding it applied against the periphery of the cavity of the base body.

The central cavity of the base body defines, with the vibrating membrane, an inner base cavity. The inner cover recess defines, with the vibrating membrane, an inner cover cavity. The shape and dimensions of the inner base and cover cavities contributes substantially to determining the acoustic qualities of the insert.

Furthermore, the hearing aids for the hard of hearing are designed to amplify the acoustic vibrations received to make them perceptible to the ear. However, certain aids comprise an adjusting device which, in position "T", adapts them for picking up a magnetic field. These aids thus make correct operation possible when the transducer is of the electromagnetic type.

On the other hand, the magnetic field radiated by the coil of an electrodynamic sensor is limited, even insufficient, for ensuring the correct operation of a hearing aid. This drawback is noticeable with piezoelectric sensors, such sensors producing no magnetic field able to act on the magnetic field sensitive aids.

To overcome this drawback, telephone receiver inserts have been designed comprising auxiliary coils, fed by the electric signal controlling the vibrating membrane, and producing an auxiliary magnetic field able to be picked up by the hearing aids.

2. Description of the Prior Art

Such a solution is described for example in the patent FR-A-2 571581 in the name of the Applicant. The solution described in this patent however requires the provision of special inserts, comprising simultaneously the usual vibrating members of an insert and the magnetic field production members. Thus, if it is desired to have a telephone set compatible with the hearing aids sensitive to the magnetic field, it is necessary to completely change the electroacoustic insert to fit an insert described in this patent.

The document DE-U-8 715 846 describes a piezoelectric insert on which a coil body may be fixed forming a distinct assembly of the insert. The coil body has an annular shape which is fitted to a cylindrical part of the insert case. The coil body comprises housings in which coil connectors are disposed forming the end of the coil winding. When the coil body is engaged on the insert case, the insert connectors penetrate progressively inside the housings of the coil body. At the end of engagement, the insert connectors are disposed entirely inside housings in the coil body, and come close to the coil connectors. Resilient added tags assemble and connect together the insert connectors and the coil connectors. Thus, in this document the addition of the coil and its connection require added resilient tags which form additional parts. Considering the small size of the housings, fitting is relatively difficult and complicates assembly. On the other hand, the method of coupling the coil to the insert body imposes a special geometrical shape on the receiver insert. The result is that a family of inserts of different diameters requires a corresponding family of coils of different diameters. The type of connection, provided by an additional part, introduces contact impedances in the main electric circuit of the insert and there is a danger of disturbing its operation following the fitting of a coil.

SUMMARY OF THE INVENTION

The object of the present invention is in particular to avoid the drawbacks of known solutions, by proposing a new insert structure, which is modular and comprises two main parts connectable together: an insert structure, with the traditional vibrating elements and its electric connection means; a separate structure comprising the coil producing the corresponding magnetic field with its electric connection means. The structure is designed so that it is possible to modify the existing inserts by fitting the module comprising the corresponding magnetic coil. Furthermore, the invention makes possible very easy fitting of the module comprising the corresponding coil, by simply adding, for example by snap-fitting, without requiring special tools or additional connection parts, and the electric connection is provided automatically at the time of snap-fitting without requiring an additional operation.

The result is that a stock of traditional inserts may be easily transformed into a stock of inserts with auxiliary coils for the hard of hearing.

Another object of the invention is to provide special electric connections making it possible to ensure correct operation of the insert even in the case where the coil becomes defective, e.g. in the case where the coil wire is cut. Moreover, fitting of the module comprising the auxiliary magnetic coil introduces no parasite contact impedances in series with the main circuit supplying the insert itself. This independence between the insert electric circuit and the coil electric circuit considerably facilitates tests which are carried out at the end of the manufacturing chain, for mass production. In fact, an operational test for the magnetic radiation of the coil and an operational test for the acoustic radiation of the insert may be carried out simultaneously. Both electric circuits being independent, the result of the tests is independent and the possible malfunction of one of the two components has no influence on the reliability of the test relative to the other component. Thus, by a single test it is possible to reliably determine which of the two components is defective.

On the other hand, and because of the structure of the invention, the addition of a coil to an insert does not require the interconnection means of the insert properly speaking to be re-designed, for they remain unchanged.

Also, the special method of coupling of the invention, between a coil and an insert, imposes no special geometrical shape on the receiver insert. The result is that the same coil may be designed which can be fitted to all the inserts of a family of inserts with different diameters.

To attain these objects, as well as others, the coil body of the invention forms a separate assembly of the insert body. The insert case comprises a rear face with means for fitting the coil body and the coil body comprises a front face with means for fastening to the rear face of the insert case. The coil body comprises two axial passages into which the axial insert connectors penetrate. Resilient conductors, disposed in the axial passages of the coil body and connected electrically to the coil winding, remain in resilient abutment against the insert connectors when the coil body is fitted to the rear face of the insert case. The axial insert connectors have a length greater than the thickness of the coil body, so that their ends project from the rear face of the coil body and remain accessible for the electric connection of the assembly when the coil body is fitted to the rear face of the insert case.

In one embodiment, the resilient conductors of the coil body are spring blades buttressed on the coil connectors.

The means for fixing the coil body to the rear face of the insert advantageously comprise square section pins projecting from the front face of the coil body and engaging in cylindrical housings in the rear face of the insert. The special structure for connection between the coil and the insert body offers every freedom in constructing the coil body itself, and makes it possible for example to integrate therein a resistor in series with the coil. This resistor limits the current flowing in the coil, which promotes impedance matching. In fact, a coil alone mounted in parallel would in practice short-circuit the output terminals of the final stage feeding the transducer.

In one embodiment, the coil body forms a cavity open to the front and communicating with the inside of the insert through a filter. In one approach, the coil body is closed at the rear and is provided with sealing means thus forming a third acoustic cavity.

Alternately, the coil body is open at the rear.

BRIEF DESCRIPTION OF THE DRAWINGS

Other objects, features and advantages of the present invention will be clear from the following description of particular embodiments, with reference to the accompanying drawings, in which.

DESCRIPTION OF THE PREFERRED EMBODIMENTS

Figure 1:
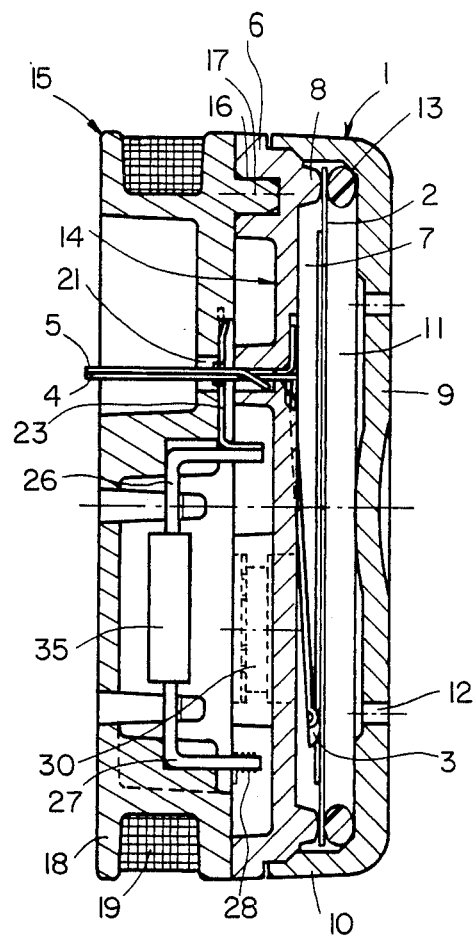
FIG. 1 is a side view in section through A—A of an assembly in accordance with the present invention, the insert and the coil body being in the assembled position.

In the embodiment shown in the figures, insert 1 of the present invention comprises a vibrating element in the form of a membrane 2. A piezoelectric membrane of known type may for example be used formed of a thin metallic or insulating film, forming the base substrate of the membrane, and on which is fixed at least one layer of piezoelectric ceramic whose faces are metallized and form electrodes. Electric connection means 3, for example of known type such as resilient metal tongues, provide the connection of the electrodes with the output connectors 4 and 5. The output connectors 4 and 5 are substantially rectangular flat metal tongues disposed in two parallel axial directions substantially perpendicular to the general plane of membrane 2. Membrane 2, for example having a substantially circular shape, is held in position at its periphery in an insert case.

The case comprises a base body 6, having a central cavity 7, whose periphery forms a bearing surface 8 for the membrane periphery. The bearing surface 8 is advantageously formed by a rigid annular relief, on which the edge of membrane 2 rests.

The case further comprises a cover 9 connected by its periphery 10 to the base body 6. Cover 9 comprises an inner recess 11 communicating with the outside through a series of orifices such as orifice 12, spaced apart evenly in the wall of the cover as shown in the figures. The cover recess 11 defines an acoustic cover cavity; the central cavity 7 of the base body defines an acoustic base body cavity; the acoustic cavities are separated from each other by membrane 2. A peripheral resilient annular seal 13, inserted between the membrane 2 and cover 9, is applied against the membrane periphery.

The base body 6 comprises in a way known per se passages for introducing and holding connectors 4 and 5 which are fixed therein.

The rear face 14 of insert 1 comprises means for fitting a coil body 15. In the embodiment shown, the rear face 14 is generally flat and the fitting means are holes with circular sections such as hole 16, spaced apart over the periphery of the rear face 14 of the insert, the holes being intended to receive pins such as pin 17 on the front face of the coil body 15.

Figure 5:
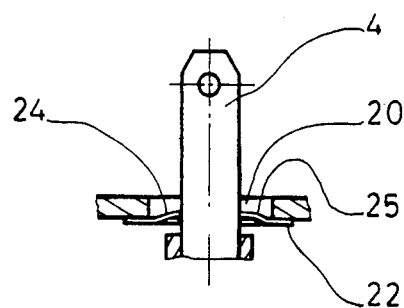
FIG. 5 is a detail view in section through B—B of FIG. 4.
Figure 4:
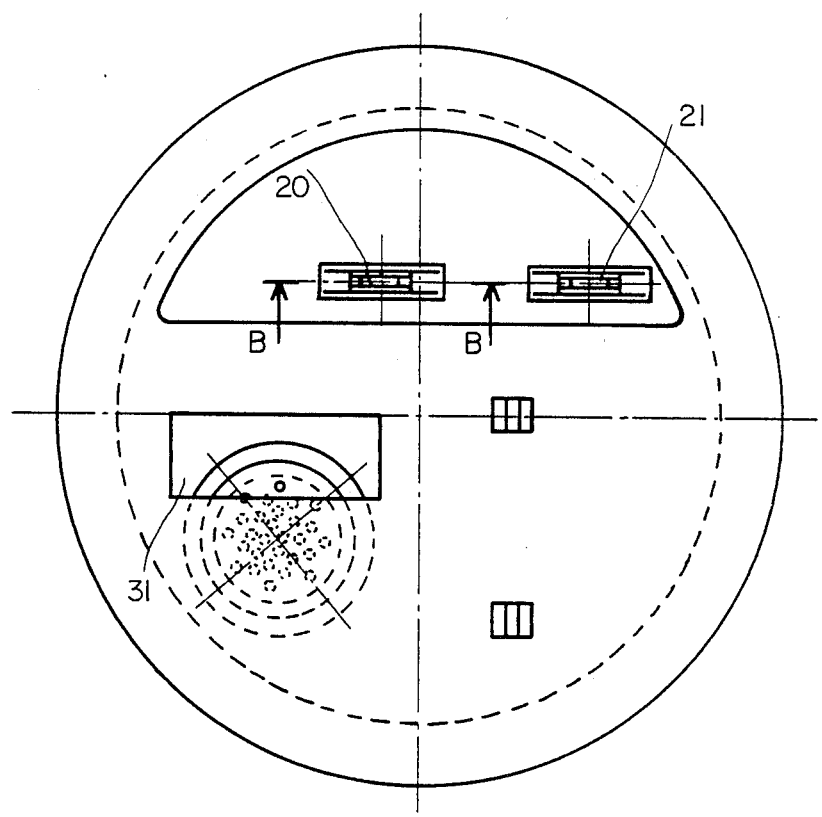
FIG. 4 shows the rear face of the coil body.

The coil body 15 comprises a structure forming a coil armature 18, on which the electric wire forming the coil winding 19 is wound. The coil body comprises two axial passages 20 and 21, disposed so that, when the coil body 15 is fitted against the rear face of the base body 6 of insert 1, connectors 4 and 5 of the insert pass through passages 20 and 21. The coil body 15 has a thickness slightly less than the length of connectors 4 and 5, so that the ends of connectors 4 and 5 project slightly from the rear face of the coil body 15 when the coil body is fitted to the insert, as shown in FIG. 1. Each of the axial passages 20 and 21 is provided with electric coil connection means formed by metal connection plates respectively 22 and 23, held in position in the coil body 15 by engagement means and comprising passages for connectors 4 and 5. The connection plates 22 and 23 comprise cut-outs forming tongues, for example tongues 24 and 25 in plate 22. As shown in section in FIG. 5, tongues 24 and 25 bear on the two edges of the corresponding connector 4 of the insert. At the time of fitting the connector into passage 20, connector 4 pushes back the tongues 24 and 25 and moves them slightly apart; the result is that the tongues are buttressed on the edges of connector 4, and thus they provide an electric contact of good quality, while preventing or considerably braking the possible withdrawal of the connector from passage 20. Thus, plates 22 and 23 fulfil at one and the same time the functions of electric connection and check means preventing dismantling.

Figure 3:
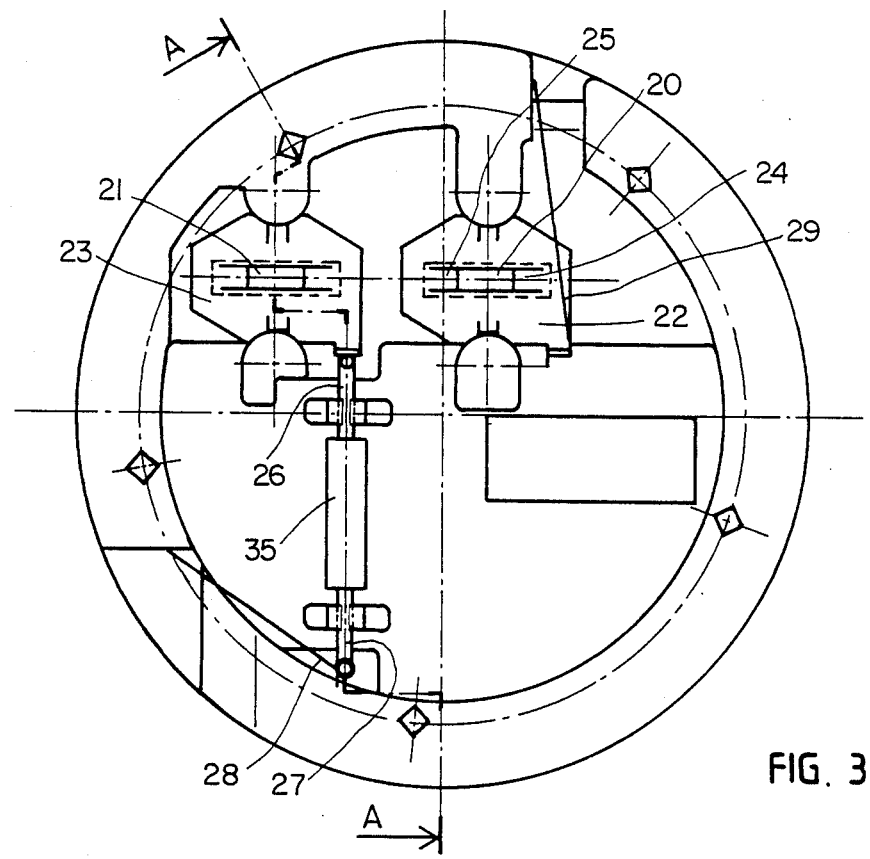
FIG. 3 shows the assembly face of the coil body of the present invention.

In the embodiment shown in the figures, the coil body further comprises an electric resistor 35, a first terminal 26 of which is soldered to the connection plate 23 and the second terminal 27 of which receives the end 28 of the electric coil winding wire 19. The other end 29 of the coil winding wire is connected electrically to the second connection plate 22, as shown in FIG. 3.

The front face of coil body 15 is generally flat, so as to mate with the rear face 14 of the insert body and comprises pins such as pin 17, preferably of square section. The section of pins 17 is adapted for force fitting in corresponding holes of round section such as hole 16 in insert 1.

Alternately, pins 17 having a different section may be used, for example circular, which engage in holes 16 of different section, for example square, in the insert.

It seems more advantageous to provide the holes in the insert and the pins on the coil body 15; thus an insert is formed which can be used with or without coil body 15, without increasing its thickness. The alternative solution which consists in providing pins on the rear face 14 of the insert body and holes in the coil body 15 is also possible in accordance with the present invention. This solution however leads to slightly increasing the thickness of insert 1 when no coil body 15 is used: the thickness of the coil body 15 must further be slightly increased for accommodating the holes.

In the embodiment shown in the figures, the coil body 15 forms a cavity open at the front, and communicating with the inside of the insert through a filter 30. The cavity of the coil body is also open towards the rear, through openings such as opening 31.

In some cases, it may be advantageous to use a coil body in which the inner cavity is closed at the rear, the bottom of the coil body being sealed. Thus, a third cavity is formed, producing an acoustic feedback, so that the qualities of the insert and of the coil body 15 no longer depend on the elements possibly disposed at the rear of the coil body 15.

Figure 2:
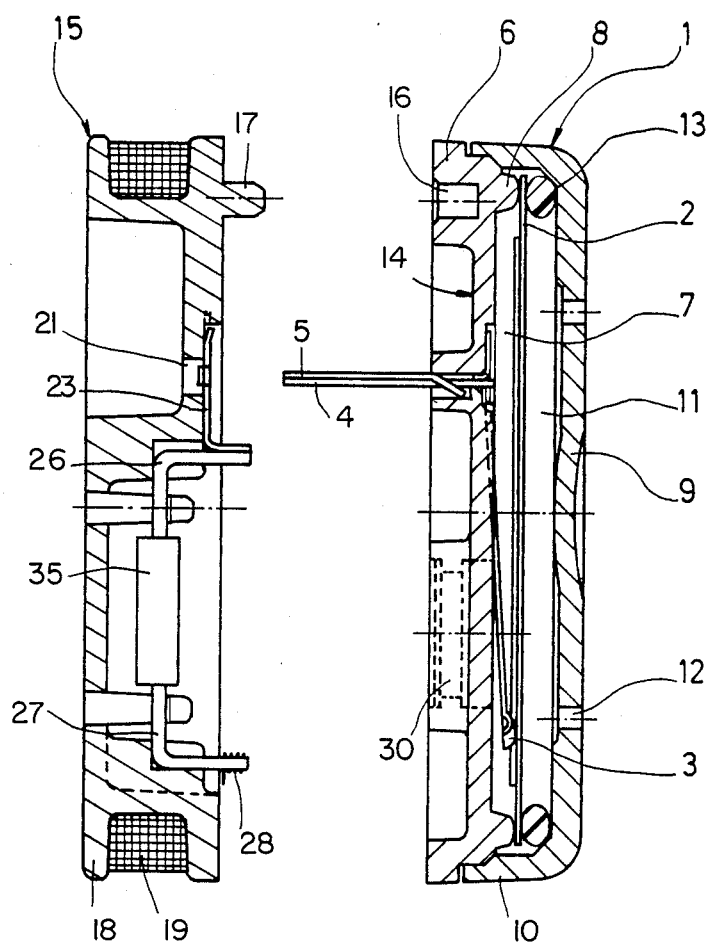
FIG. 2 shows the assembly of FIG. 1 in a position in which the coil body is separated from the insert.

The operation of the device is the following: starting from a dismantled position shown in FIG. 2, in which insert 1 and coil body 15 are two distinct and separate elements, the coil body 15 is brought close to insert 1, the front face of the coil body 15 being disposed towards the rear face 14 of the insert. Connectors 4 and 5 are engaged in the corresponding passages 20 and 21; connectors 4 and 5 push back the corresponding tongues such as tongues 24 and 25 and pins 17 are engaged progressively in the corresponding holes 16. By pressing insert 1 and coil body 15 against each other, the pins 17 are engaged entirely in holes 16. The electric connection is then automatically provided, by the fact that connectors 4 and 5 are in contact with the connection plates 20 and 21, the electric connection of the assembly is provided through the accessible ends of connectors 4 and 5.

Figure 6:
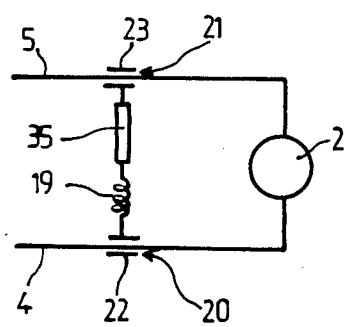
FIG. 6 illustrates the electric connection diagram of the present invention.

FIG. 6 illustrates the electric connection diagram for the different elements of the transducer of the present invention in the assembled position shown in FIG. 1. The assembly formed by coil 19 and the series resistor 35 is connected in parallel across membrane 2; the main electric membrane circuit 2, formed by the membrane and connectors 4 and 5 is not modified by the addition of the assembly formed by coil 19 and resistor 35, plates 22 and 23 simply rubbing on connectors 4 and 5 while leaving their ends free for the connection of the assembly to an external electric circuit.

The present invention is not limited to the embodiments which have been explicitly described, but includes the different variants and generalizations thereof contained within the scope of the following claims.

What is claimed is:

1. An electroacoustic transducer, comprising a telephone receiver insert formed of a membrane transforming into sound vibrations the electric signals conveyed to axial input connectors by a supply line, said membrane being inserted in a case formed of a base body and a cover, the transducer further comprising an auxiliary device formed of an electric coil, fed by the electric signals of the supply line, and producing an auxiliary magnetic field modulated by these signals and able to be picked up by a hearing aid for the hard of hearing, the coil being contained in a coil body forming a separate assembly from the insert and which can be fitted and fixed to the case of the insert, the coil body comprising two axial passages into which the axial input connectors penetrate, wherein:

said insert case comprises a rear face with means for fitting the coil body, the coil body comprises means for fixing to the rear face of the insert case, resilient conductors disposed in the axial passages of the coil body and connected electrically to the coil winding remain in resilient abutment on the insert connectors when the coil body is fitted to the rear face of the insert case, said axial input connectors have a length greater than the thickness of said coil body, so that their ends project from the rear face of the coil body and remain accessible for the electric connection of the assembly when the coil body is fitted to the rear face of said insert case.

2. Transducer as claimed in claim 1, wherein the resilient conductors are connection plates having resilient tongues which are pushed back and moved slightly apart by the corresponding connector when it is introduced, and which are buttressed on the corresponding connector.

3. Transducer as claimed in claim 1 wherein the means for fitting said coil body on the insert comprise pins provided on the connecting face of one of the two elements formed by the coil body and the insert, said pins being force fitted into holes with corresponding section provided in the opposite connecting face of the other of said two elements.

4. Transducer as claimed in claim 3, wherein said pins have a circular section and are intended to be force fitted into holes with square section.

5. Transducer as claimed in claim 3, wherein said pins have a square section, and are intended to be force fitted into corresponding holes of circular section.

6. Transducer as claimed in claim 4, wherein said holes are formed in the rear face of the insert and said pins are formed on the front face of said coil body.

7. Transducer as claimed in claim 1, wherein said coil body forms a cavity open at the front and communicating with the inside of the insert through a filter.

8. Transducer as claimed in claim 7, wherein said coil body is closed at the rear and forms an acoustic cavity.

9. Transducer as claimed in claim 7, wherein said coil body is open at the rear.

10. Transducer as claimed in claim 1, wherein the coil winding is connected in series with an electric resistor between said resilient conductors.

* * * * *